(12) United States Patent
Mattes

(10) Patent No.: US 11,759,874 B2
(45) Date of Patent: Sep. 19, 2023

(54) HARVESTING KNIFE AND METHOD FOR THE PRODUCTION THEREOF

(71) Applicant: Wimatec Mattes GmbH, Ostrach (DE)

(72) Inventor: Stefan Mattes, Ostrach (DE)

(73) Assignee: Wimatec Mattes GmbH, Ostrach (DE)

( * ) Notice: Subject to any disclaimer, the term of this patent is extended or adjusted under 35 U.S.C. 154(b) by 0 days.

(21) Appl. No.: 17/668,836

(22) Filed: Feb. 10, 2022

(65) Prior Publication Data

US 2022/0161338 A1 May 26, 2022

Related U.S. Application Data

(62) Division of application No. 16/322,165, filed as application No. PCT/EP2017/069738 on Aug. 3, 2017, now Pat. No. 11,278,974.

(30) Foreign Application Priority Data

Aug. 5, 2016 (DE) ..................... 10 2016 114 552.1

(51) Int. Cl.
- B23D 61/02 (2006.01)
- A01D 34/412 (2006.01)
- B23D 65/00 (2006.01)
- A01D 45/02 (2006.01)

(52) U.S. Cl.
CPC ......... *B23D 61/023* (2013.01); *A01D 34/412* (2013.01); *B23D 61/021* (2013.01); *B23D 61/025* (2013.01); *B23D 65/00* (2013.01); *A01D 45/02* (2013.01)

(58) Field of Classification Search
CPC .. B23D 61/023; B23D 61/021; B23D 61/025; B23D 65/00; A01D 34/412

USPC ............................................. 83/42
See application file for complete search history.

(56) References Cited

U.S. PATENT DOCUMENTS

| | | | |
|---|---|---|---|
| 435,380 A | | 8/1890 | Perkins |
| 3,915,046 A | * | 10/1975 | Schmidt ............... B23D 61/023 |
| | | | 83/838 |
| 5,855,157 A | | 1/1999 | Okamura et al. |
| 7,171,798 B1 | | 2/2007 | Bernardy |
| 2006/0213342 A1 | | 9/2006 | Turner et al. |
| 2006/0242845 A1 | | 11/2006 | Kooima |

(Continued)

FOREIGN PATENT DOCUMENTS

| | | |
|---|---|---|
| CN | 201 726 671 U | 2/2011 |
| DE | 28 42 105 A1 | 4/1980 |

(Continued)

OTHER PUBLICATIONS

Office Action dated Jan. 31, 2019 issued in corresponding EP patent application No. 17196238.4 (and partial English translation).

(Continued)

*Primary Examiner* — Omar Flores Sanchez
(74) *Attorney, Agent, or Firm* — POSZ LAW GROUP, PLC

(57) ABSTRACT

A harvesting knife has a base body, which is configured to be applied in a manner rotating in a machine around a drive rotational axis allocated to said base body, and has a plurality of teeth on its circumference wherein, prior to a first application, at least one of the teeth has at least one cutter formed thereon.

21 Claims, 4 Drawing Sheets

(56) References Cited

U.S. PATENT DOCUMENTS

| | | | |
|---|---|---|---|
| 2010/0058917 A1 | 3/2010 | Scandroglio et al. | |
| 2013/0327198 A1 | 12/2013 | Stark | |
| 2015/0319922 A1 | 11/2015 | Stoffel et al. | |

FOREIGN PATENT DOCUMENTS

| | | |
|---|---|---|
| DE | 33 27 895 A1 | 2/1985 |
| DE | 101 45 170 C1 | 5/2003 |
| DE | 198 25 758 B4 | 3/2005 |
| EP | 0 982 093 A1 | 3/2000 |
| EP | 2 674 237 A1 | 12/2013 |
| GB | 2 031 704 A | 4/1980 |
| JP | S56-134128 U | 10/1981 |
| JP | S62-171612 A | 7/1987 |
| JP | 2003-266237 A | 9/2003 |
| JP | 2005-124407 A | 5/2005 |
| JP | 2008-263934 A | 11/2008 |

OTHER PUBLICATIONS

Search Report dated Jul. 3, 2017 in corresponding German Patent Application No. 10 2016 114 552.1 (and English translation).
International Preliminary Report on Patentability dated Feb. 5, 2019 in the corresponding PCT application No. PCT/EP2017/069738.
International Search Report of the International Searching Authority dated Nov. 17, 2017 in the corresponding PCT application No. PCT/EP2017/069738.
Office Action dated Jul. 8, 2021 issued in corresponding EP patent application No. 17 751 702.6 (and English translation).

* cited by examiner

HARVESTING KNIFE AND METHOD FOR THE PRODUCTION THEREOF

CROSS REFERENCE TO RELATED APPLICATIONS

This application is a divisional of application Ser. No. 16/322,165 filed on Jan. 31, 2019 which is a U.S. national stage application of International Application No. PCT/EP2017/069738 filed on Aug. 3, 2017, which claims priority to German Patent Application No. 10 2016 114 552.1 filed on Aug. 5, 2016, the contents of which are incorporated herein by reference.

PRIOR ART

The invention relates to a harvesting knife and a method for the production thereof.

From DE 198 25 758 B1 there is known a saw which is configured to be used for harvesting corn, among other things. The saw has a base body, which is configured to be applied in a manner rotating in a machine around a drive rotational axis allocated to said base body, and has teeth on its circumference. Moreover, the harvesting knife has a coating, which is arranged partly on one side of the base body.

The problem which the invention proposes to solve is in particular to provide a harvesting knife with improved cutting properties and/or improved properties in regard to service life as well as an advantageous method for producing such a harvesting knife. The problem is solved in particular by the features of the independent claims, while advantageous embodiments and modifications of the invention can be found in the dependent claims.

BENEFITS OF THE INVENTION

The invention is based on a harvesting knife having a base body, which is configured to be applied in a manner rotating in a machine around a drive rotational axis allocated to said base body, and having a plurality of teeth on its circumference It is proposed that, prior to a first application, at least one of the teeth has at least one cutter formed thereon.

The term "configured" is in particular to mean specifically designed and/or equipped. When an object is configured for a particular function, it should be understood as meaning in particular that the object fulfills and/or performs this particular function in at least one state of application and/or operation. The term "cutter" should be understood as meaning in particular a region of the base body having a diminishing material thickness in the direction of a cutting edge, in particular at least substantially parallel to a principal plane of the base body, and leading to the cutting edge, wherein the material thickness may be realized in a steplike manner and/or in particular and preferably continuously diminishing. The term "prior to a first application" should be understood as meaning in particular that the cutter is formed on the base body already during the manufacturing, so that it is present on a new and unused harvesting knife. The term principal plane of the base body should be understood as meaning in particular a plane which is subtended by a principal extension of the base body and which is oriented perpendicular to the drive rotational axis. Moreover, the term "at least substantially" should be understood as meaning in particular a deviation by less than 10°.

By an appropriate implementation it is possible to achieve an especially advantageous cutting behavior already before the start of use of the harvesting knife. Moreover, the harvesting knife may be designed especially advantageously in terms of little wear, in particular because the cutter can already be very particularly designed during the manufacture and in particular can be very particularly positioned.

Preferably, regarding the at least one tooth with the at least one cutter, preferably for at least a large part of the teeth of the base body, the cutter extends only partly over an outer contour of the tooth. The term "outer contour" is in particular to mean a contour of a shadow image of the tooth, in particular when viewed in the direction of the drive rotational axis. The term "partial" should be understood as meaning in this context in particular that at least partial regions of the outer contour of the tooth, and in particular at least partial segments of the contour of the shadow image, are implemented either with another cutter or cutter-free, which means that the individual cutter does not extend over the entire outer contour, i.e. not over the entire contour of the shadow image of the tooth.

By an appropriate implementation, the tooth can be designed in an especially robust manner and a loss of teeth during operation can be reduced and the service life can be increased.

Furthermore, it is proposed that the at least one tooth with the at least one cutter, preferably for at least a majority of the teeth of the base body, has a tooth back which is formed at least partly cutter-free, by which an advantageous cutting behavior and furthermore an especially stable tooth can be achieved. The term "tooth back" should be understood as meaning here in particular a portion of the tooth which differs from a tooth front facing in the direction of rotation and/or which is formed by a radially outward facing end face of the base body. Basically, however, it is also conceivable for partial regions of the tooth front to be embodied cutter-free and/or for partial regions of the tooth back to be embodied with a cutter.

Moreover, it is proposed that the at least one tooth comprises at least two cutters with cutting edges of different material thicknesses, such that the tooth can be designed especially advantageously specifically in terms of its different stresses and functions. One of the cutters is preferably formed by a tapering in the circumferential direction, while the second cutter is formed by a tapering in the radial direction. The taperings can be formed by steps and/or preferably by continuous sections.

In a further embodiment it is proposed that a tooth back of the at least one tooth with the at least one cutter, preferably at least for a large part of the teeth of the base body, is implemented to be wedge-shaped when viewed in the radial direction toward the drive rotational axis. The term "wedge" should be understood as meaning in particular a form in which two side faces, and in the present case preferably an upper side face of the base body running at least substantially perpendicular to the drive rotational axis and a lower side face of the base body running at least substantially perpendicular to the drive rotational axis, come together at an acute angle. The term "at least substantially" should be understood as meaning once again a deviation by less than 10°.

By an appropriate implementation, the cutter can be formed especially easily and an especially effective cutter can be achieved.

The two side faces may taper toward a midplane of the base body running perpendicular to the drive rotational axis, thus forming a double wedge. Especially advantageously, however, viewed in a radial direction toward the drive rotational axis, a side face, and preferably the entire side face of the tooth back, runs at least substantially, i.e., in particular with a deviation by less than 5° and preferably less than 2%, parallel to a principal plane of the base body that extends perpendicular to the drive rotational axis, by which the cutter can be formed in an especially economical manner.

Moreover, it is proposed that the base body is implemented at least partly of a cold-worked material, so that thin metal sheets may be used advantageously for the production of the base body and advantageous cutting properties can be achieved with long service life. The term "cold-worked material" should be understood as meaning in particular a material which has been formed specifically for hardening below a recrystallization temperature and in particular at a temperature below 100° C., preferably at a temperature below 50° C. Especially preferably, the material is hardened by means of cold rolling.

Preferably, the cold-worked material of which the base body is at least partly implemented has a base tensile strength greater than 500 N/mm$^2$ and in particular greater than 600 N/mm$^2$. The term "base tensile strength" should be understood as meaning a tensile strength which is present without further heat strengthening.

If the cold-worked material of which the base body is at least partly implemented has a base tensile strength less than 1000 N/mm$^2$ and in particular less than 900 N/mm$^2$, in addition to a long service life and a thin base body, it is furthermore possible to achieve an advantageous formation of the cutters.

Especially suitable as the material is a tempering steel, such as in particular and especially preferably a steel 51CRV4, or also a drill steel, such as in particular and especially preferably a steel 30MNB5.

If at least individual cutters are formed at least partly by a chip-free process, in particular by means of a stamping process, an especially economical production can be achieved.

Moreover, undesirable stresses and possibly associated damage can be advantageously prevented, in particular during use, if at least one cutter is formed by means of a hot-forging process, i.e., in particular at a temperature above 600° C.

In another embodiment of the invention it is proposed that at least one cutter is formed at least partly by means of a material-removing process, in particular a machining process, by which it can be formed in an especially flexible manner. Basically, it is also conceivable for the teeth to be formed by a combination of a chip-removing process and a chipless process. Moreover, it is also conceivable for the at least one cutter to be formed by means of a 3D-laser cutter.

If the base body is partly heat-cured, i.e., only in one individual region or in individual regions, individual regions can be advantageously and specifically designed for their loading stresses in an economical manner. Especially advantageously, the base body is heat-cured at its outer circumference, i.e., in particular in the region of the cutters, while in a further inward region, i.e., in the direction of the drive rotational axis, advantageously no separate heat-curing is present.

Moreover, the base body advantageously has a saw tooth profile. The term "saw tooth profile" should be understood as meaning in particular a profile in which one tooth front, which is preferably formed by a cutter, is hollowed out and in particular is formed to be concave-shaped and/or is inclined in the rotation direction and/or in particular is not inclined against the rotation direction and/or is configured to move harvested material in the direction of the drive rotational axis during operation. The term "hollowed out" should be understood as meaning in particular that a radial line from the drive rotational axis through a tooth tip encloses a free space between the tooth front and itself. By an appropriate implementation, an especially advantageous aggressive cutting behavior can be achieved.

Moreover, if the base body has at least one tooth spacing resulting in more than 8 teeth and in particular more than 15 teeth along a distance of half a meter in the circumferential direction, an especially advantageous cutting behavior can be achieved. The term "tooth spacing" should be understood as meaning in particular a distance in the circumferential direction between two tooth tips.

If the base body has at least one tooth spacing resulting in fewer than 30 teeth and in particular fewer than 28 teeth along a distance of half a meter in the circumferential direction, a simple fabrication can be assured, in addition to an advantageous cutting behavior. Especially advantageously, the base body has a tooth spacing resulting in a number of teeth between 20 and 25 along a distance of half a meter in the circumferential direction. Basically, it is also conceivable for the base body to have different tooth spacings.

In another embodiment of the invention it is proposed that a tooth back of the at least one tooth with the at least one cutter, preferably in the case of a large part of the teeth of the base body, is provided at least partly with a coating, by which the wear can be further reduced and the service life further enhanced. In particular, wear can be reduced that is caused by a translatory forward motion of the harvesting knife, which is superimposed on a rotational movement of the harvesting knife.

Furthermore, a method is proposed for the production of a harvesting knife according to the invention.

Moreover, a method is proposed for the production of a harvesting knife having a base body, which is configured to be applied in a manner rotating in a machine around a drive rotational axis allocated to said base body, and having a plurality of teeth on its circumference, wherein a thermal energy which is introduced into the base body for its coating is utilized for a hardening process of the base body. An energy input can thus be utilized advantageously for several production steps and production costs can be saved, in particular when no further heating is done prior to the hardening process and after the heating for the coating and/or an active cooldown for the hardening process is performed directly after the heating for the coating and/or in particular no active cooldown is performed after the coating and before the hardening process. The term "active cooldown" should be understood as meaning in particular the specific cooling of the base body by a medium different from air, such as in particular a fluid, and/or with a specifically generated flow, such as in particular a gas flow or in particular an air flow.

DRAWINGS

Further benefits will emerge from the following description of the drawings. The drawings represent exemplary embodiments of the invention. The drawings, the description and the claims contain many features in combination. The person skilled in the art will expediently also consider the features individually and combine them into further meaningful combinations.

Figure 1:
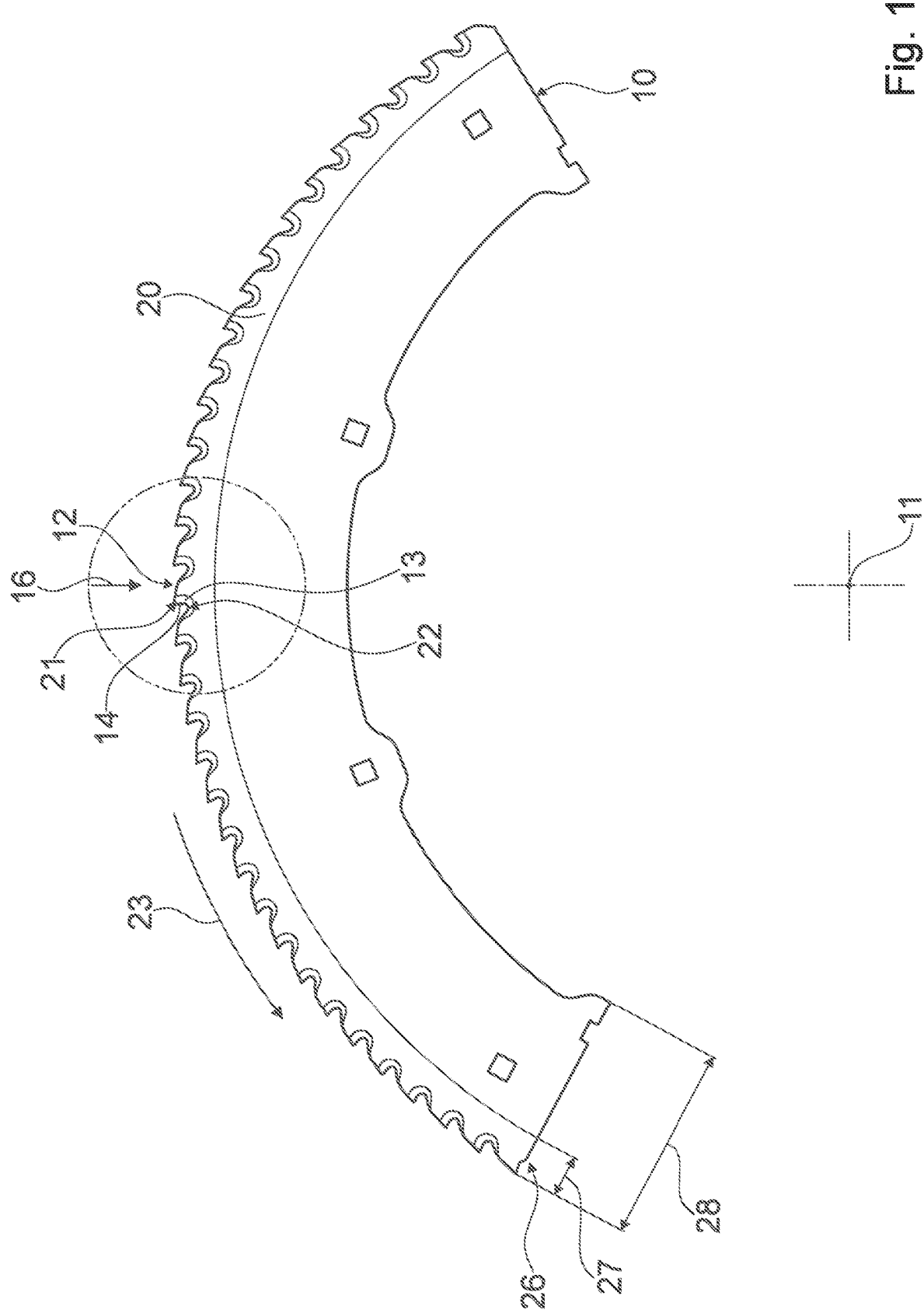
FIG. 1 shows a harvesting knife in a top view.
Figure 2:
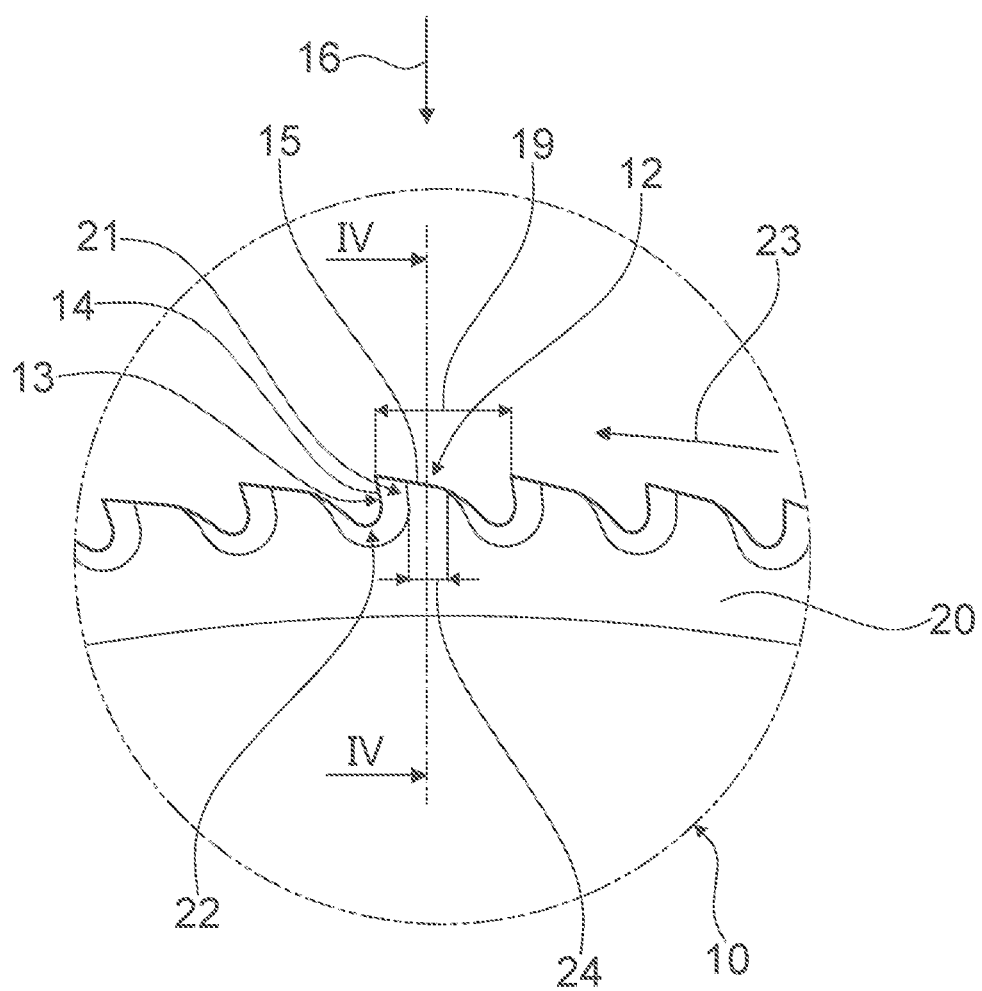
FIG. 2 shows an enlarged cutout II of FIG. 1.
Figure 3:
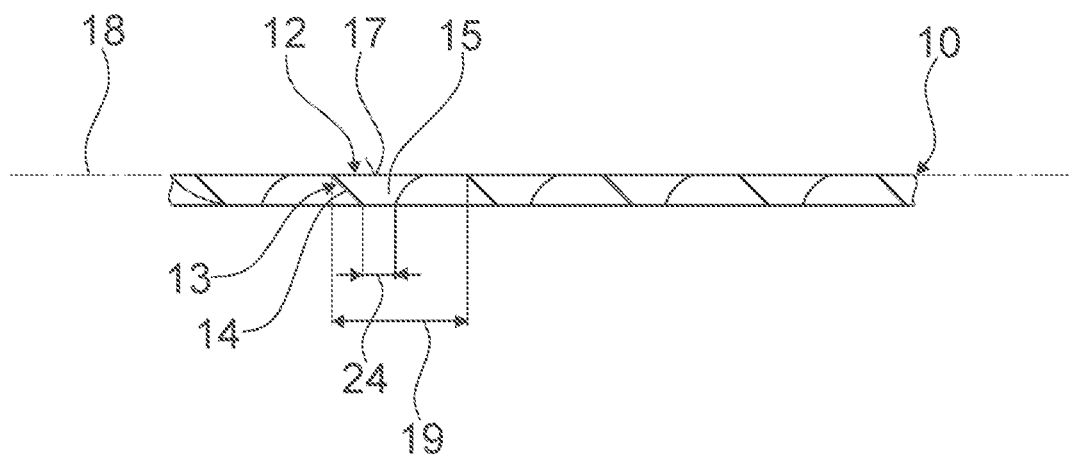
Figure 4:
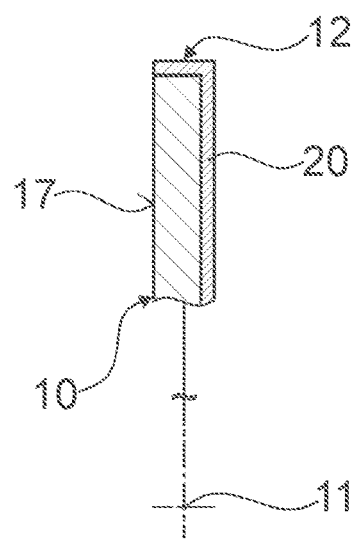
Figure 5:
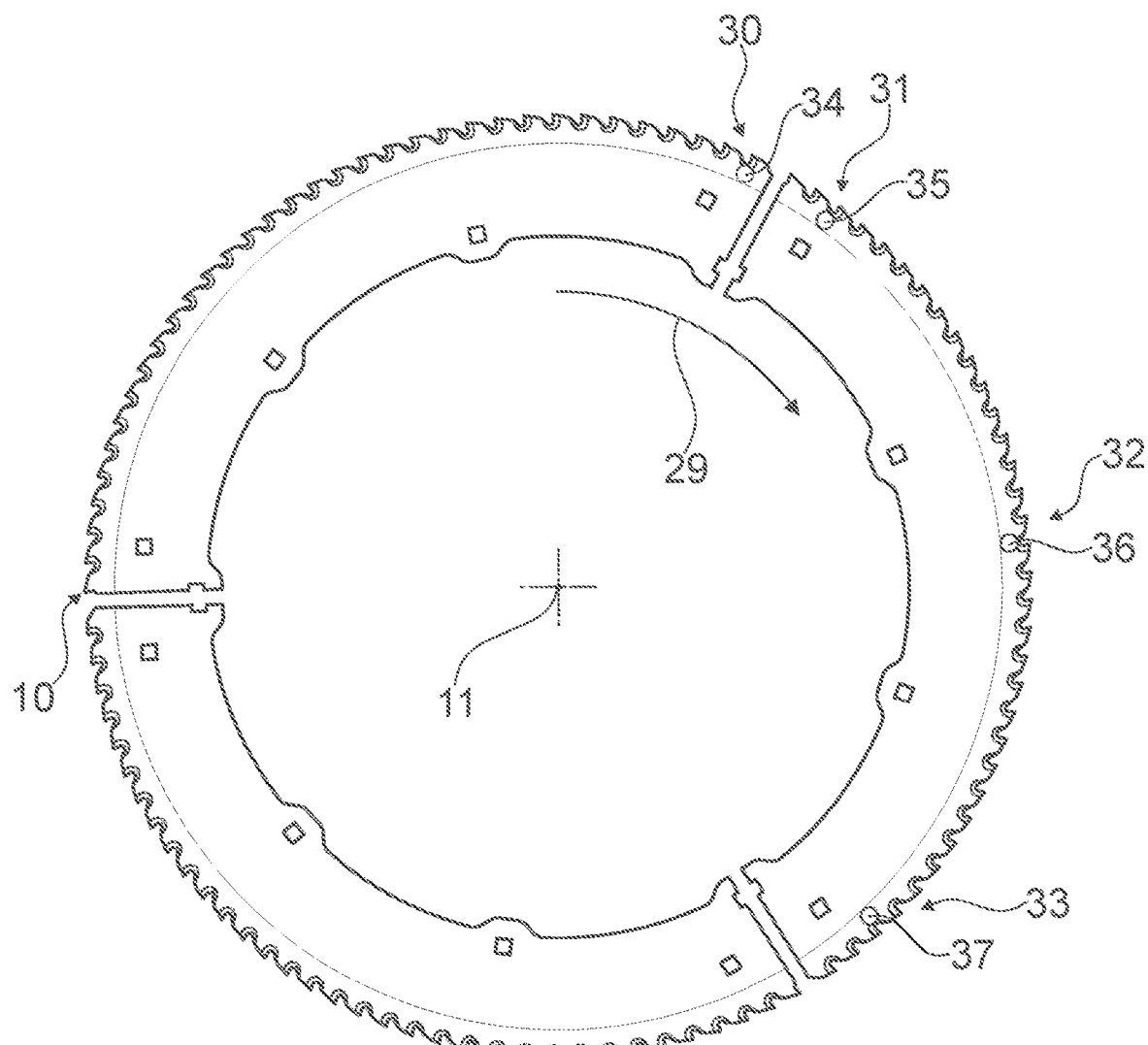
Figure 6:
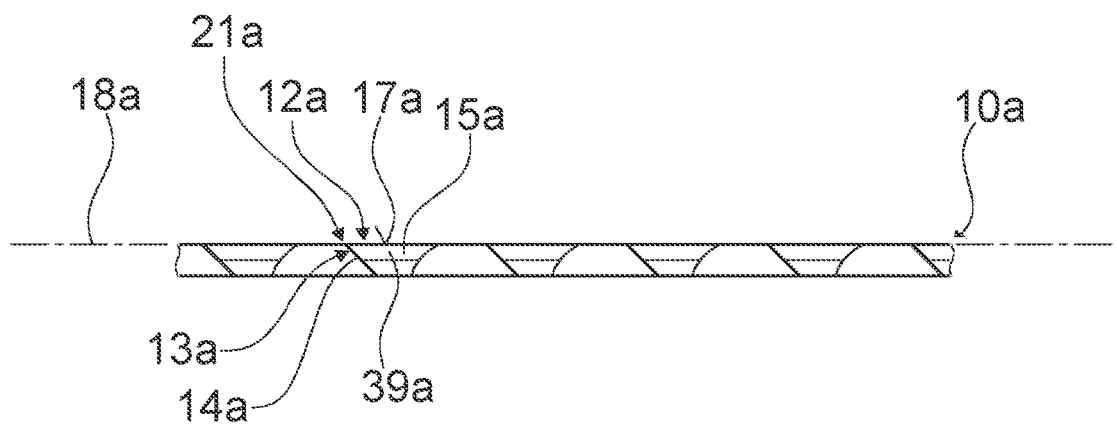
Figure 7:
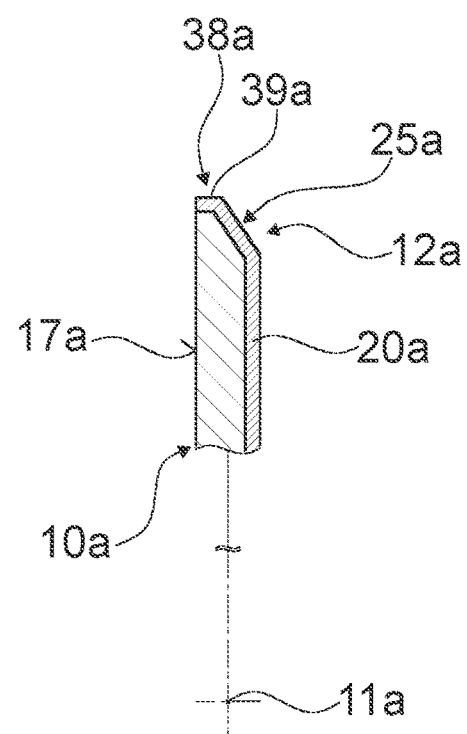

FIG. 3 shows a cutout of the harvesting knife in an enlarged view in the radial direction to a drive rotational axis of the harvesting knife, FIG. 4 shows a section along line IV-IV in FIG. 2 in an enlarged representation, FIG. 5 shows a schematic diagram of the method for production of the harvesting knife of FIG. 1, FIG. 6 shows a cutout of an alternative harvesting knife in a view corresponding to FIG. 3 and FIG. 7 shows a section corresponding to FIG. 4 through the alternative harvesting knife

DESCRIPTION OF THE EXEMPLARY EMBODIMENTS

FIG. 1 shows a harvesting knife having a base body 10, which is configured to be applied in a manner rotating in a harvesting machine, not represented in more detail, around a drive rotational axis 11 allocated to said base body, and having a plurality of teeth 12 on its circumference. The harvesting knife is formed by a circular ring segment and comprises a saw tooth profile. Several harvesting knives of this kind are assembled into a circular ring and are driven together rotating around the drive rotational axis 11 during a harvesting process. The base body 10 has a tooth spacing 19 which results in 20 teeth 12 along a length of half a meter in the circumferential direction (FIGS. 1 to 4). The harvesting knife has a radius of 500 mm, but it is basically conceivable for the harvesting knife to have preferably a radius larger than 200 mm and smaller than 1000 mm.

The teeth 12 have cutters 13 formed thereon prior to a first application. The teeth 12 are embodied identically. Basically, however, it would also be conceivable to provide differently implemented teeth. The teeth 12 are arranged directly behind one another in the circumferential direction. Basically, however, it would also be conceivable for the teeth 12 to be side-set, i.e., at least some teeth are deflected in a first direction parallel to the drive rotational axis 11 and some teeth 12 are deflected in a second direction, opposite to the first direction, parallel to the drive rotational axis 11.

The cutter 13 extends only partly over an outer contour of the tooth 12, and the tooth 12 has a tooth back 15, which is formed partly cutter-free (FIGS. 2, 3 and 4). The tooth 12 has a region 21 with a continuously diminishing material thickness in the direction of a cutting edge 14, parallel to a principal plane 18 of the base body 10, and leading to the cutting edge 14. The cutter 13 extends across an entire tooth front of the tooth 12. The region 21 extends in the circumferential direction beyond a tooth base 22 and ends at a tooth back of a tooth following the tooth 12 in the cutting direction 23. Between two regions 21 with diminishing material thickness the tooth back 15 of the tooth 12 has a region 24 which is cutter-free (FIGS. 2 to 4).

Viewed in parallel to the principal plane 18, in the radial direction 16 toward the drive rotational axis 11, the tooth back 15 of the tooth 12 is wedge shaped wherein in a view parallel to the principal plane 18, in the radial direction 16 toward the drive rotational axis 11, a side face 17 of the tooth back 15 runs parallel to the principal plane 18 of the base body 10 and extends in the circumferential direction over the entire tooth 12 and in particular also in the region of the cutter 13 (FIG. 3).

The base body 10 is implemented of a cold-worked material, namely, a cold-worked tempering steel 51CRV4.

The base body 10 has a base tensile strength of substantially, i.e., with a deviation by less than 15% and preferably less than 10%, at least 800 N/mm². The base body 10 is cut out by means of a laser cutting process from a sheet of tempering steel. After this, the cutters 13 are formed by means of a material-removing process, i.e., by means of a milling process.

The base body 10 is partly heat-cured at its outer circumference and partly provided with a coating 20, namely in a region 26 having an extension 27 in the radial direction, having substantially 20% of a radial total extension 28 of the base body 10 (FIG. 1). The tooth back 15 of the tooth 12 is also provided with the coating 20 (FIGS. 4 and 4a). The coating 20 is formed from a nickel-based alloy with tungsten carbide. Basically, however, other metal alloys which the skilled person deems advisable, in particular those with hard materials, are also conceivable.

FIG. 5 shows, in a highly schematized manner, various steps of the method for producing the harvesting knife. A plurality of harvesting knives are placed in the circumferential direction 29 one after the other on a device, such that the harvesting knives can simply pass through the same steps of the method in succession. Preferably, the harvesting knives are assembled into a circular ring corresponding to their later use in a harvesting machine. Then the harvesting knives are preferably taken to various stations 30, 31, 32, 33, moving in the circumferential direction 29.

At one station 30, the harvesting knives are preheated by a burner 34 from below in a region of their outer circumference or in the region 26 that is configured for the coating. In a second station 32, powder is applied to the harvesting knife from above by means of a burner 35 in the region 26 of the outer circumference to generate the coating 20. In a third station 32, the powder is melted by means of a burner 36. A thermal energy introduced by the burner 36 into the base body 10 and utilized for the coating of the base body 10 is furthermore utilized for a hardening process. With no further thermal input, the harvesting knives are cooled down in a following station 33, preferably immediately after the station 32. In the station 33, the harvesting knives are cooled down by an air flow created by means of a blower 37, so that a fouling of the harvesting knife can be advantageously avoided. Alternatively, however, one could also use water, an emulsion, an oil, etc., for a cooldown.

FIGS. 6 and 7 show cutouts of an alternative harvesting knife. The following specifications are confined substantially to the differences between the exemplary embodiments, and for the unchanged components, features and functions one may refer to the description of the exemplary embodiment in FIGS. 1 to 5. In order to distinguish the exemplary embodiments, the letter a has been appended to the reference numbers of the exemplary embodiment in FIGS. 6 and 7. As regards the same designated components, in particular as regards components with the same reference numbers, one may basically also refer to the drawings and/or the description of the exemplary embodiment in FIGS. 1 to 5.

The harvesting knife in FIGS. 6 and 7 has a base body 10a with teeth 12a, having besides a first cutter 13a also a second cutter 38a with a cutting edge 39a, differing in its material thickness from a cutting edge 14a of the first cutter 13a. The cutting edge 39a has a greater material thickness than the cutting edge 14a.

The tooth 12a has, in addition to a region 21a having a continuously diminishing material thickness in the direction of the cutting edge 14a, parallel to a principal plane 18a of the base body 10a, also a further region 25a having a continuously diminishing material thickness in the direction of the cutting edge 39a, parallel to the principal plane 18a of the base body 10a and in the radial direction to a drive rotational axis 11a. Thus, the tooth 12a has a tooth back 15a, which furthermore forms the cutting edge 39a.

LIST OF REFERENCE NUMERALS

10 Base body
11 Drive rotational axis
12 Tooth
13 Cutter
14 Cutting edge
15 Tooth back
16 Direction
17 Side face
18 Principal plane
19 Tooth spacing
20 Coating
21 Region
22 Tooth base
23 Cutting direction
24 Region
25 Region
26 Region
27 Extension
28 Total extension
29 Circumferential direction
30 Station
31 Station
32 Station
33 Station
34 Burner
35 Burner
36 Burner
37 Blower
38 Cutter
39 Cutting edge

The invention claimed is:

1. A harvesting knife having a base body, which is configured to be applied in a manner rotating in a machine around a drive rotational axis allocated to said base body, and having a plurality of teeth on its circumference,
wherein, prior to a first application, at least one of the teeth has at least one cutter formed thereon wherein regarding the at least one tooth with the at least one cutter, the cutter extends only partly over an outer contour of the tooth, wherein the at least one tooth with the at least one cutter has a tooth back which is formed at least partly cutter-free, wherein the at least one cutter has a region having a diminishing material thickness in the direction of a cutting edge, at least substantially parallel to a principal plane of the base body, and leading to the cutting edge.

2. The harvesting knife as claimed in claim 1, wherein, viewed in a radial direction toward the drive rotational axis, a tooth back of the at least one tooth with the at least one cutter is wedge-shaped.

3. The harvesting knife as claimed in claim 2, wherein, in a view in the radial direction toward the drive rotational axis, a side face of the tooth back runs at least substantially parallel to a principal plane of the base body that extends perpendicular to the drive rotational axis.

4. The harvesting knife as claimed in claim 1, wherein the base body is implemented at least partly of a cold-worked material.

5. The harvesting knife as claimed in claim 4, wherein the cold-worked material of which the base body is at least partly implemented has a base tensile strength greater than 600 N/mm².

6. The harvesting knife as claimed in claim 4, wherein the cold-worked material of which the base body is at least partly implemented has a base tensile strength of less than 900 N/mm².

7. The harvesting knife as claimed in claim 1, wherein at least one cutter is formed at least partly by means of a stamping process.

8. The harvesting knife as claimed in claim 7, wherein at least one cutter is formed by means of a hot-forging process.

9. The harvesting knife as claimed in claim 1, wherein the at least one cutter is formed at least partly by means of a machining process.

10. The harvesting knife as claimed in claim 1, wherein the base body is partly heat-cured.

11. The harvesting knife as claimed in claim 1, wherein the base body has at least one tooth spacing resulting in more than 15 teeth along a distance of half a meter in the circumferential direction.

12. The harvesting knife as claimed in claim 1, wherein the base body has at least one tooth spacing resulting in fewer than 28 teeth along a distance of half a meter in the circumferential direction.

13. The harvesting knife as claimed in claim 1, wherein a tooth back of the at least one tooth with the at least one cutter is provided at least partly with a coating.

14. A method for the production of a harvesting knife as claimed in claim 1, comprising forming at least one of the teeth with at least one cutter thereon, wherein regarding the at least one tooth with the at least one cutter, including forming the cutter to extend only partly over an outer contour of the tooth, forming the at least one tooth with the at least one cutter having a tooth back to be at least partly cutter-free, and including forming the at least one cutter to have a region having a diminishing material thickness in the direction of a cutting edge, at least substantially parallel to a principal plane of the base body, and leading to the cutting edge.

15. The method for the production of a harvesting knife as claimed in claim 14, further comprising utilizing, in a hardening process of the base body, a thermal energy which is introduced into the base body for its coating.

16. The harvesting knife as claimed in claim 1, wherein the harvesting knife is formed by a circular ring segment.

17. The harvesting knife as claimed in claim 1, wherein the cutter extends across an entire tooth front of the tooth.

18. The harvesting knife as claimed in claim 1, wherein the cutter has a cutting edge angled to the drive rotational axis.

19. The harvesting knife as claimed in claim 1, wherein the tooth has a tooth back along the circumference, which is parallel to the drive rotational axis.

20. The harvesting knife as claimed in claim 1, wherein the base body is heat-cured at its outer circumference in the region of the cutters.

21. The harvesting knife as claimed in claim 1, wherein the teeth and the base body are embodied one-piece.

* * * * *